(12) United States Patent
Shin et al.

(10) Patent No.: US 11,316,194 B2
(45) Date of Patent: Apr. 26, 2022

(54) GEL POLYMER ELECTROLYTE COMPOSITION, GEL POLYMER ELECTROLYTE PREPARED THEREBY, AND LITHIUM SECONDARY BATTERY INCLUDING THE GEL POLYMER ELECTROLYTE

(71) Applicant: LG CHEM, LTD., Seoul (KR)

(72) Inventors: Won Kyung Shin, Daejeon (KR); Kyoung Ho Ahn, Daejeon (KR); Chul Haeng Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 85 days.

(21) Appl. No.: 16/761,488

(22) PCT Filed: Jan. 3, 2019

(86) PCT No.: PCT/KR2019/000109
§ 371 (c)(1),
(2) Date: May 4, 2020

(87) PCT Pub. No.: WO2019/135624
PCT Pub. Date: Jul. 11, 2019

(65) Prior Publication Data
US 2020/0295402 A1    Sep. 17, 2020

(30) Foreign Application Priority Data

Jan. 3, 2018  (KR) .................. 10-2018-0000795
Jan. 3, 2019  (KR) .................. 10-2019-0000622

(51) Int. Cl.
*H01M 10/0565* (2010.01)
*H01M 10/0525* (2010.01)
*H01M 10/052* (2010.01)

(52) U.S. Cl.
CPC ..... *H01M 10/0565* (2013.01); *H01M 10/052* (2013.01); *H01M 10/0525* (2013.01);
(Continued)

(58) Field of Classification Search
CPC .. H01M 10/0567; H01M 4/134; H01M 4/382; H01M 10/0565; H01M 4/505;
(Continued)

(56) References Cited

U.S. PATENT DOCUMENTS 7,064,174 B2 * 6/2006 Lewis ............... C07F 9/091
528/38
8,691,928 B2  4/2014 Hsieh et al.
(Continued)

FOREIGN PATENT DOCUMENTS

CN    106058312 A    10/2016
EP    3648227 A1    5/2020
(Continued)

OTHER PUBLICATIONS

Extended European Search Report issued in related European Application No. 19736166.0 dated Nov. 18, 2020.
(Continued)

*Primary Examiner* — Matthew J Merkling
(74) *Attorney, Agent, or Firm* — Morgan, Lewis & Bockius LLP

(57) ABSTRACT

The present invention relates to a gel polymer electrolyte composition and a lithium secondary battery including the same, and particularly, to a gel polymer electrolyte composition, in which flame retardancy is improved by including an ionic liquid, instead of a non-aqueous organic solvent, as well as a lithium salt, a polymerization initiator, and an oligomer having a specific structure, and a lithium secondary battery in which high-temperature stability is improved by including the same.

19 Claims, 4 Drawing Sheets

(52) U.S. Cl.
CPC ............... *H01M 2300/0045* (2013.01); *H01M 2300/0082* (2013.01); *H01M 2300/0085* (2013.01)

(58) Field of Classification Search
CPC .. H01M 4/525; H01M 10/0525; H01G 53/50; C08F 20/36
See application file for complete search history.

(56) References Cited

U.S. PATENT DOCUMENTS

| | | |
|---|---|---|
| 10,243,239 B1 | 3/2019 | Ahn et al. |
| 2005/0064293 A1 | 3/2005 | Shen et al. |
| 2008/0171267 A1 | 7/2008 | Kang et al. |
| 2011/0207021 A1 | 8/2011 | Fujinami et al. |
| 2011/0233532 A1* | 9/2011 | Sotzing ............... H01L 51/0034 257/40 |
| 2011/0287325 A1 | 11/2011 | Zaghib et al. |
| 2012/0029099 A1 | 2/2012 | Hsieh et al. |
| 2012/0308882 A1 | 12/2012 | Ito et al. |
| 2013/0040207 A1 | 2/2013 | Gupta et al. |
| 2014/0024792 A1* | 1/2014 | Sotzing ................... C09K 9/02 526/256 |
| 2015/0017547 A1 | 1/2015 | Hsieh et al. |
| 2015/0155594 A1 | 6/2015 | Lee et al. |
| 2016/0072148 A1 | 3/2016 | Lee et al. |
| 2017/0125868 A1 | 5/2017 | Kim et al. |
| 2017/0204241 A1* | 7/2017 | Nicolay ............ H01M 10/0565 |
| 2017/0331153 A1* | 11/2017 | Sun .................. H01M 10/0568 |
| 2017/0373347 A1 | 12/2017 | Lee et al. |
| 2018/0254152 A1* | 9/2018 | Matsuo .................. H01G 11/84 |
| 2019/0036162 A1* | 1/2019 | Oh ..................... C08F 299/024 |
| 2019/0319299 A1* | 10/2019 | Amine ............. H01M 10/0568 |
| 2020/0274197 A1* | 8/2020 | Shin .................... H01M 10/052 |
| 2020/0295402 A1* | 9/2020 | Shin .................. H01M 10/4235 |
| 2020/0365939 A1* | 11/2020 | Shin ......................... C08F 20/36 |

FOREIGN PATENT DOCUMENTS

| | | |
|---|---|---|
| EP | 3648230 A1 | 5/2020 |
| JP | H06-310378 A | 11/1994 |
| JP | 2001-307776 A | 11/2001 |
| JP | 2007-194149 A | 8/2007 |
| JP | 2007-280912 A | 10/2007 |
| JP | 2010-253687 A | 11/2010 |
| JP | 4708450 B2 | 6/2011 |
| JP | 5429845 B2 | 2/2014 |
| KR | 10-2003-0096805 A | 12/2003 |
| KR | 10-2006-0102414 A | 9/2006 |
| KR | 10-2011-0033106 A | 3/2011 |
| KR | 10-2014-0066163 A | 5/2014 |
| KR | 10-2015-0064763 A | 6/2015 |
| KR | 10-2016-0029599 A | 3/2016 |
| KR | 10-2016-0040128 A | 4/2016 |
| KR | 10-2016-0108035 A | 9/2016 |
| KR | 10-1679719 B1 | 11/2016 |
| KR | 10-2017-0029486 A | 3/2017 |
| KR | 10-2017-0052388 A | 5/2017 |
| WO | 2016053064 A1 | 4/2016 |

OTHER PUBLICATIONS

International Search Report (with partial translation) and Written Opinion issued in corresponding International Patent Application No. PCT/KR2019/000109, dated Apr. 22, 2019.

* cited by examiner

GEL POLYMER ELECTROLYTE COMPOSITION, GEL POLYMER ELECTROLYTE PREPARED THEREBY, AND LITHIUM SECONDARY BATTERY INCLUDING THE GEL POLYMER ELECTROLYTE

Cross-Reference to Related Applications

This application claims the benefit of Korean Patent Application Nos. 2018-0000795, filed on Jan. 3, 2018, and 2019-0000622, filed on Jan. 3, 2019, in the Korean Intellectual Property Office, the disclosure of which is incorporated herein in its entirety by reference.

TECHNICAL FIELD

The present invention relates to a gel polymer electrolyte composition having improved flame retardancy, a gel polymer electrolyte prepared thereby, and a lithium secondary battery including the gel polymer electrolyte.

BACKGROUND ART

Demand for secondary batteries as an energy source has been significantly increased as technology development and demand with respect to mobile devices have increased, and, among these secondary batteries, lithium secondary batteries having high energy density and voltage have been commercialized and widely used.

A lithium secondary battery has a structure, in which an electrode assembly including a positive electrode, a negative electrode, and a separator disposed between the positive electrode and the negative electrode is stacked or wound, and is configured by accommodating the electrode assembly into a battery case and injecting a non-aqueous electrolyte solution thereinto. Charging and discharging of the lithium secondary battery proceeds while a process is repeated in which lithium ions of the positive electrode are intercalated into and deintercalated from the negative electrode.

A liquid electrolyte solution including an organic solvent, in which an electrolyte salt is dissolved, has been mainly used as the non-aqueous electrolyte solution. However, the liquid electrolyte solution is disadvantageous in that the possibility of volatizing the organic solvent is not only high, but stability is also low due to combustion caused by increases in ambient temperature and temperature of the battery itself.

That is, in order to improve the energy density of the lithium secondary battery, a driving voltage of the battery must be increased, but, since the liquid electrolyte solution is oxidized and decomposed under a high-voltage condition of 4.3 V or more, an unstable film having a non-uniform composition is formed on a surface of the positive electrode. Since the formed film is not stably maintained during repeated charge and discharge to induce continuous oxidative decomposition of the electrolyte solution, this continuous decomposition reaction forms a thick resistive layer on the surface of the positive electrode and consumes lithium ions and electrons which contribute to reversible capacity, and thus, this causes a problem of reducing capacity of the positive electrode.

In order to address these limitations, a lithium polymer secondary battery, in which a gel polymer electrolyte having excellent electrochemical stability is used instead of the liquid electrolyte solution, has recently emerged.

Since the gel polymer electrolyte has excellent electrochemical stability in comparison to the liquid electrolyte solution, a thickness of the secondary battery may not only be constantly maintained, but the leakage of the electrolyte solution may also be prevented, and thus, a lithium secondary battery having improved stability may be prepared.

However, since the non-aqueous organic solvent included in the gel polymer electrolyte degrades battery lifetime while it causes irreversible capacity by being oxidatively decomposed at high temperature and high voltage due to poor oxidation resistance, the gel polymer electrolyte is disadvantageous in that it is not easy to secure flame retardancy similar to the liquid electrolyte solution.

Thus, there is a need to develop a gel polymer electrolyte having improved flame retardancy as well as oxidation resistance even in a high-voltage and high-temperature environment.

PRIOR ART DOCUMENT

Korean Patent Application Laid-open Publication No. 2011-0033106

DISCLOSURE OF THE INVENTION

Technical Problem

An aspect of the present invention provides a gel polymer electrolyte composition having improved flame retardancy.

Another aspect of the present invention provides a gel polymer electrolyte which is prepared by polymerizing the gel polymer electrolyte composition.

Another aspect of the present invention provides a lithium secondary battery in which high-temperature stability is improved by including the gel polymer electrolyte.

Technical Solution

According to an aspect of the present invention, there is provided a gel polymer electrolyte composition for a lithium secondary battery which includes a lithium salt, an ionic liquid, a polymerization initiator, and
an oligomer, represented by Formula 1.

[Formula 1]

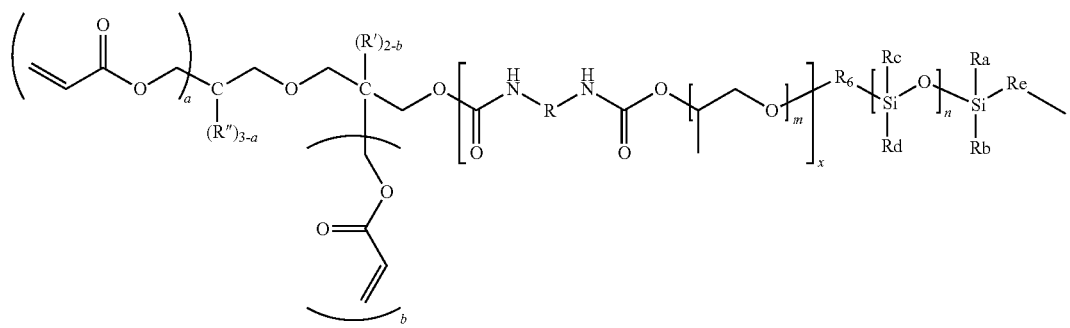

-continued

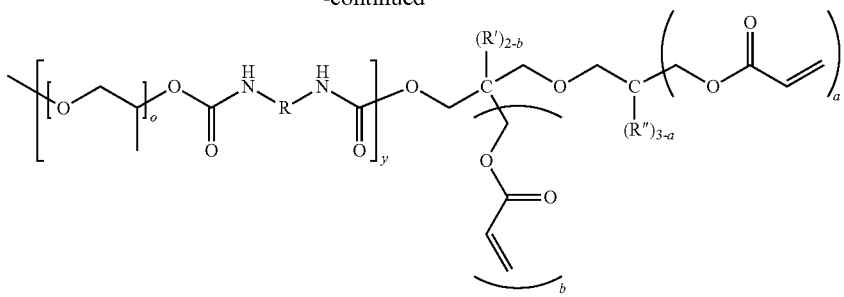

In Formula 1,

R is an aliphatic hydrocarbon group or an aromatic hydrocarbon group, $R_a$, $R_b$, $R_c$, and $R_d$ are each independently an unsubstituted or substituted alkyl group having 1 to 3 carbon atoms, $R_0$ is an unsubstituted or substituted alkylene group having 1 to 5 carbon atoms or

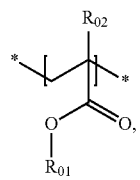

wherein $R_{01}$ is an unsubstituted or substituted alkyl group having 1 to 10 carbon atoms, an unsubstituted or substituted alkenyl group having 2 to 10 carbon atoms, a cycloalkyl group having 3 to 10 carbon atoms, a cycloalkyl group having 3 to 10 carbon atoms which has a heteroatom, an unsubstituted or substituted aryl group, or an unsubstituted or substituted heteroaryl group, $R_{02}$ is hydrogen or an unsubstituted or substituted alkyl group having 1 to 3 carbon atoms, R' and R" are each independently hydrogen or an alkyl group having 1 to 3 carbon atoms, $R_e$ is an unsubstituted or substituted alkylene group having 1 to 5 carbon atoms, a is an integer of 1 to 3, b is an integer of 0 to 2, n, m, o, x, and y are the numbers of repeating units, n is an integer of 1 to 10, m and o are each independently an integer of 1 to 5, and x and y are each independently an integer of 1 to 15.

The lithium salt may include Li$^+$ as a cation, and may include at least one selected from the group consisting of $BF_4^-$, $PF_6^-$, $ClO_4^-$, bis(fluorosulfonyl)imide ($N(SO_2F)_2^-$; FSI), (bis)trifluoromethanesulfonimide ($N(SO_2CF_3)_2^-$, TFSI), bisperfluoroethanesulfonimide ($N(SO_2C_2F_5)_2^-$, and oxalyldifluoroborate ($BF_2(C_2O_4)^-$, ODFB) as an anion.

Also, the ionic liquid may include the same anion as the anion of the lithium salt as an anion component, and may include at least one selected from the group consisting of compounds represented by Formulae 2 to 6 below as a cation component.

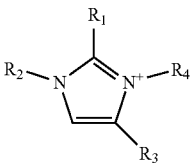

[Formula 2]

In Formula 2, $R_1$, $R_2$, $R_3$, and $R_4$ are each independently hydrogen or an alkyl group having 1 to 5 carbon atoms.

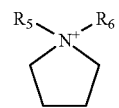

[Formula 3]

In Formula 3, $R_5$ and $R_6$ are each independently an alkyl group having 1 to 5 carbon atoms.

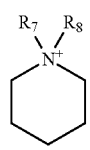

[Formula 4]

In Formula 4, $R_7$ and $R_8$ are each independently an alkyl group having 1 to 5 carbon atoms.

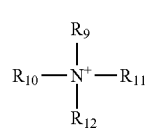

[Formula 5]

In Formula 5, $R_9$, $R_{10}$, $R_{11}$, and $R_{12}$ are each independently an alkyl group having 1 to 5 carbon atoms.

[Formula 6]

In Formula 6, $R_{13}$, $R_{14}$, $R_{15}$, and $R_{16}$ are each independently an alkyl group having 1 to 5 carbon atoms.

The oligomer represented by Formula 1 may be included in an amount of 0.2 wt % to 30 wt % based on a total weight of the gel polymer electrolyte composition for a lithium secondary battery.

According to another aspect of the present invention, there is provided a gel polymer electrolyte which is prepared by polymerizing the gel polymer electrolyte composition of the present invention.

According to another aspect of the present invention, there is provided a lithium secondary battery including the gel polymer electrolyte of the present invention.

Advantageous Effects

According to the present invention, a gel polymer electrolyte for a lithium secondary battery having improved high-temperature storage stability and a lithium secondary battery including the same may be prepared by using a gel polymer electrolyte composition for a lithium secondary battery in which flame retardancy is improved by including an ionic liquid instead of including a non-aqueous organic solvent.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
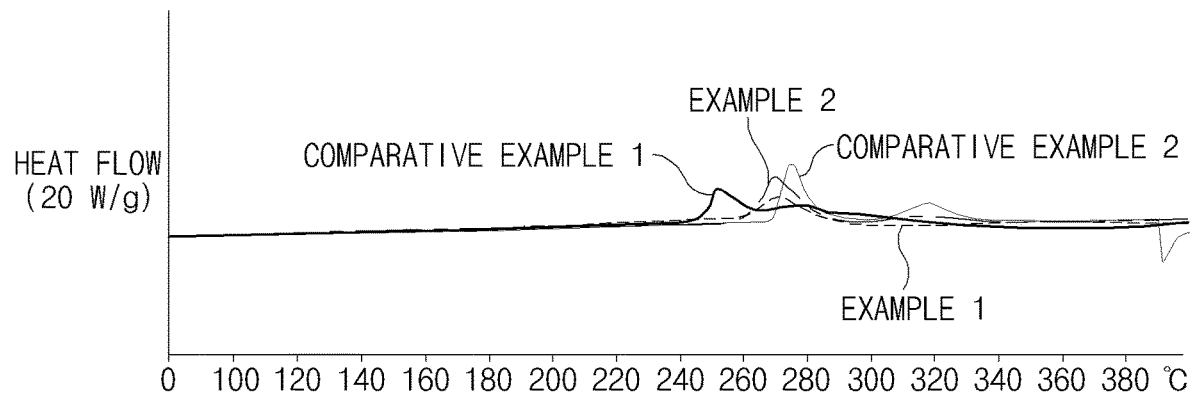
FIG. 1 is a graph showing results of evaluating thermal stabilities of lithium secondary batteries in Experimental Example 3 of the present invention.

Hereinafter, the present invention will be described in more detail. In this case, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

It will be further understood that the terms "include," "comprise," or "have" in this specification specify the presence of stated features, numbers, steps, elements, or combinations thereof, but do not preclude the presence or addition of one or more other features, numbers, steps, elements, or combinations thereof.

Before describing the present invention, the expressions "a" and "b" in the description of "a to b carbon atoms" in the specification each denote the number of carbon atoms included in a specific functional group. That is, the functional group may include "a" to "b" carbon atoms. For example, the expression "alkylene group having 1 to 5 carbon atoms" denotes an alkylene group including 1 to 5 carbon atoms, that is, —$CH_2$—, —$CH_2CH_2$—, —$CH_2CH_2CH_2$—, —$CH_2(CH_2)CH$—, —$CH(CH_2)CH_2$—, and —$CH(CH_2)CH_2CH_2$—.

The expression "alkylene group" denotes a branched or unbranched divalent unsaturated hydrocarbon group. In an embodiment, the alkylene group may be unsubstituted or substituted. The alkylene group may include a methylene group, an ethylene group, a propylene group, an isopropylene group, a butylene group, an isobutylene group, a tert-butylene group, a pentylene group, and 3-pentylene group.

Also, unless otherwise defined in the specification, the expression "substitution" denotes that at least one hydrogen bonded to carbon is substituted with an element other than hydrogen, for example, an alkyl group having 1 to 2 carbon atoms.

Furthermore, in the present specification, the expression "%" denotes wt % unless explicitly stated otherwise.

[A Gel Polymer Electrolyte Composition for a Lithium Secondary Battery]

Specifically, in an embodiment of the present invention, provided is a gel polymer electrolyte composition for a lithium secondary battery which includes a lithium salt, an ionic liquid, a polymerization initiator, and an oligomer represented by Formula 1 below.

[Formula 1]

-continued

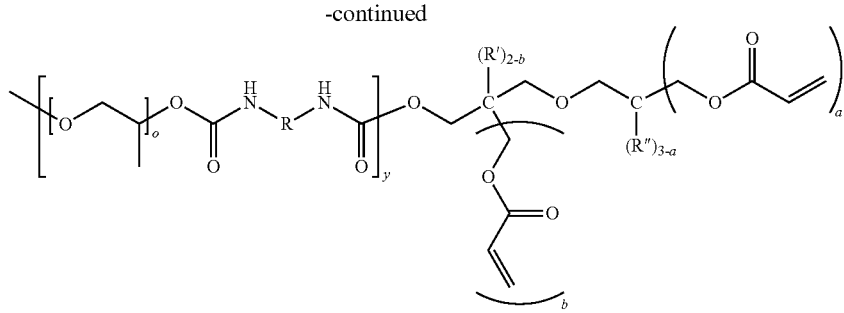

In Formula 1,

R is an aliphatic hydrocarbon group or an aromatic hydrocarbon group, $R_a$, $R_b$, $R_c$, and $R_d$ are each independently an unsubstituted or substituted alkyl group having 1 to 3 carbon atoms, $R_0$ is an unsubstituted or substituted alkylene group having 1 to 5 carbon atoms or

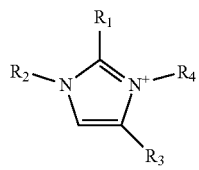

wherein $R_{01}$ is an unsubstituted or substituted alkyl group having 1 to 10 carbon atoms, an unsubstituted or substituted alkenyl group having 2 to 10 carbon atoms, a cycloalkyl group having 3 to 10 carbon atoms, a cycloalkyl group having 3 to 10 carbon atoms which has a heteroatom, an unsubstituted or substituted aryl group, or an unsubstituted or substituted heteroaryl group, $R_{02}$ is hydrogen or an unsubstituted or substituted alkyl group having 1 to 3 carbon atoms, R' and R'' are each independently hydrogen or an alkyl group having 1 to 3 carbon atoms, $R_e$ is an unsubstituted or substituted alkylene group having 1 to 5 carbon atoms, a is an integer of 1 to 3, b is an integer of 0 to 2, n, m, o, x, and y are the numbers of repeating units, n is an integer of 1 to 10, m and o are each independently an integer of 1 to 5, and x and y are each independently an integer of 1 to 15.

Particularly, it is desirable that the gel polymer electrolyte composition for a lithium secondary battery of the present invention does not contain a non-aqueous organic solvent.

(1) Lithium Salt

In the gel polymer electrolyte composition for a lithium secondary battery of the present invention, any lithium salt typically used in an electrolyte for a lithium secondary battery may be used as the lithium salt without limitation, and, specifically, the lithium salt may include $Li^+$ as a cation, and may include at least one selected from the group consisting of $BF_4^-$, $PF_6^-$, $ClO_4^-$, bis(fluorosulfonyl)imide $(N(SO_2F)_2^-$; FSI), (bis)trifluoromethanesulfonimide $(N(SO_2CF_3)_2^-$, TFSI), bisperfluoroethanesulfonimide $(N(SO_2C_2F_5)_2^-$, BETI), and oxalyldifluoroborate $(BF_2(C_2O_4)^-$, ODFB) as an anion.

Specifically, the lithium salt may include at least one selected from the group consisting of $LiBF_4$, $LiPF_6$, $LiClO_4$, $LiN(SO_2F)_2$, $LiN(SO_2CF_3)_2$, $LiN(SO_2C_2F_5)_2$, and $LiBF_2(C_2O_4)$.

The lithium salt may be appropriately changed in a normally usable range, but may specifically be included in a concentration of 0.8 M to 3 M, for example, 1.0 M to 2.5 M in the gel polymer electrolyte composition. In a case in which the concentration of the lithium salt is greater than 3 M, since viscosity of an electrolyte is increased, a lithium ion-transfer effect may be reduced.

(2) Ionic Liquid

The gel polymer electrolyte composition of the present invention includes an ionic liquid with high oxidation stability and low possibility of ignition as a main solvent. That is, since the gel polymer electrolyte composition of the present invention includes the ionic liquid containing the same anion component as the anion of the lithium salt, as the main solvent, instead of a non-aqueous organic solvent oxidatively decomposed at high temperature and high voltage due to low oxidation resistance, oxidation resistance and flame retardancy of the gel polymer electrolyte may be secured.

The ionic liquid may include the same anion component as the anion of the lithium salt, specifically, at least one selected from the group consisting of $BF_4^-$, $PF_6^-$, $ClO_4^-$, bis(fluorosulfonyl)imide $(N(SO_2F)_2^-$; FSI), (bis)trifluoromethanesulfonimide $(N(SO_2CF_3)_2^-$, TFSI), bisperfluoroethanesulfonimide $(N(SO_2C_2F_5)_2^-$, BETI), and oxalyldifluoroborate $(BF_2(C_2O_4)^-$, ODFB) as an anion component.

The ionic liquid may include at least one selected from the group consisting of compounds represented by Formulae 2 to 6 below as a cation component.

[Formula 2]

$$\begin{array}{c} R_1 \\ R_2-N \underset{\phantom{X}}{\overset{\phantom{X}}{\diagdown}} N^+-R_4 \\ R_3 \end{array}$$

In Formula 2, $R_1$, $R_2$, $R_3$, and $R_4$ are each independently hydrogen or an alkyl group having 1 to 5 carbon atoms.

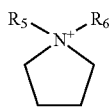
[Formula 3]

In Formula 3, $R_5$ and $R_6$ are each independently an alkyl group having 1 to 5 carbon atoms.

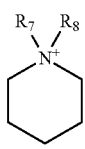
[Formula 4]

In Formula 4, $R_7$ and $R_8$ are each independently an alkyl group having 1 to 5 carbon atoms.

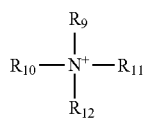
[Formula 5]

In Formula 5, $R_9$, $R_{10}$, $R_{11}$, and $R_{12}$ are each independently an alkyl group having 1 to 5 carbon atoms.

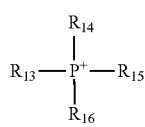
[Formula 6]

In Formula 6, $R_{13}$, $R_{14}$, $R_{15}$, and $R_{16}$ are each independently an alkyl group having 1 to 5 carbon atoms.

Specifically, the cation represented by Formula 2 may include at least one selected from the group consisting of compounds represented by Formulae 2a and 2b below.

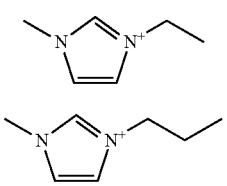
[Formula 2a]

[Formula 2b]

Also, the cation represented by Formula 3 may include at least one selected from the group consisting of compounds represented by Formulae 3a and 3b below.

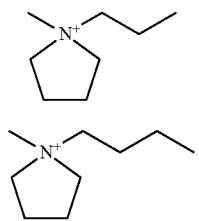
[Formula 3a]

[Formula 3b]

Furthermore, the cation represented by Formula 4 may include at least one selected from the group consisting of compounds represented by Formulae 4a and 4b below.

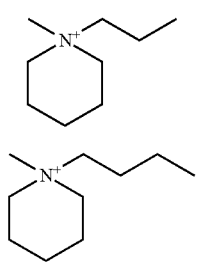
[Formula 4a]

[Formula 4b]

Also, in Formula 5, $R_9$, $R_{10}$, $R_{11}$, and $R_{12}$ may each independently be an alkyl group having 1 to 3 carbon atoms.

Furthermore, the cation represented by Formula 6 may be a compound represented by Formula 6a below.

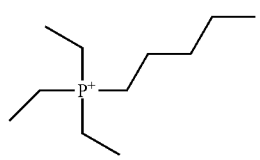
[Formula 6a]

The ionic liquid, as the main solvent of the gel polymer electrolyte composition for a lithium secondary battery, may be included in an amount of 50 wt % or more, for example, 60 wt % or more based on a total weight of the gel polymer electrolyte composition for a lithium secondary battery.

(3) Polymerization Initiator

The gel polymer electrolyte composition of the present invention includes a polymerization initiator.

A conventional polymerization initiator capable of generating radicals by heat and light may be used as the polymerization initiator. For example, an azo-based polymerization initiator or a peroxide-based polymerization initiator may be used as the above polymerization initiator, and representative examples of the polymerization initiator may be at least one peroxide compound selected from the group consisting of benzoyl peroxide, acetyl peroxide, dilauryl peroxide, di-tert-butyl peroxide, t-butyl peroxy-2-ethylhexanoate, cumyl hydroperoxide, and hydrogen peroxide, or at least one azo compound selected from the group consisting of 2,2'-azobis(2-cyanobutane), dimethyl 2,2'-azobis(2-methylpropionate), 2,2'-azobis(methylbutyronitrile), 2,2'-azobis(iso-butyronitrile) (AIBN), and 2,2'-azobisdimethyl-valeronitrile (AMVN).

The polymerization initiator may form a radical by being decomposed by heat in the battery, for a non-limiting example, at a temperature of 30° C. to 100° C., for example, 60° C. to 80° C., or by being decomposed at room temperature (5° C. to 30° C.)

The polymerization initiator may be included in an amount of about 0.01 part by weight to about 20 parts by weight, for example, 5 parts by weight based on total 100 parts by weight of the oligomer. In a case in which the amount of the polymerization initiator included is within the above range, since a gelation reaction is easily performed, it is possible to prevent the occurrence of gelation during the injection of the composition into the battery or to prevent the remaining unreacted polymerization initiator from causing a side reaction after the polymerization reaction.

Particularly, with respect to some polymerization initiators, nitrogen or oxygen gas may be generated in the process of radical generation by heat. This gas generation is most likely to lead to a gas trap or gas bubbling phenomenon in a gel polymer electrolyte formation process. Since the gas generation causes defects in the gel polymer electrolyte, it results in degradation of the electrolyte. Thus, in the case that the polymerization initiator is included in an amount within the above range, it is possible to more effectively prevent a disadvantage such as generation of a large amount of gas.

(4) Oligomer Represented by Formula 1

Also, the gel polymer electrolyte composition for a lithium secondary battery of the present invention may include an oligomer represented by Formula 1 below as a polymerizable compound capable of forming a polymer network.

group, or an unsubstituted or substituted heteroaryl group, $R_{02}$ is hydrogen or an unsubstituted or substituted alkyl group having 1 to 3 carbon atoms, R' and R" are each independently hydrogen or an alkyl group having 1 to 3 carbon atoms, $R_e$ is an unsubstituted or substituted alkylene group having 1 to 5 carbon atoms, a is an integer of 1 to 3, b is an integer of 0 to 2, n, m, o, x, and y are the numbers of repeating units, n is an integer of 1 to 10, m and o are each independently an integer of 1 to 5, and x and y are each independently an integer of 1 to 15.

Specifically, in Formula 1, $R_a$, $R_b$, $R_c$, and $R_d$ may each independently be an unsubstituted or substituted alkyl group having 1 to 2 carbon atoms, $R_0$ may be an unsubstituted or substituted alkylene group having 1 to 5 carbon atoms, R' and R" may each independently be hydrogen or an alkyl group having 1 to 2 carbon atoms, $R_e$ may be an unsubstituted or substituted alkylene group having 1 to 3 carbon atoms, and m and o may each independently be an integer of 2 to 4.

More specifically, in Formula 1, the aliphatic hydrocarbon group of R comprises (a) at least one alicyclic hydrocarbon group or (b) at least one linear hydrocarbon group, wherein the alicyclic hydrocarbon group is selected from the group consisting of an unsubstituted or substituted cycloalkylene group having 4 to 20 carbon atoms, an unsubstituted or substituted cycloalkenylene group having 4 to 20 carbon atoms, and an unsubstituted or substituted heterocycloal-

[Formula 1]

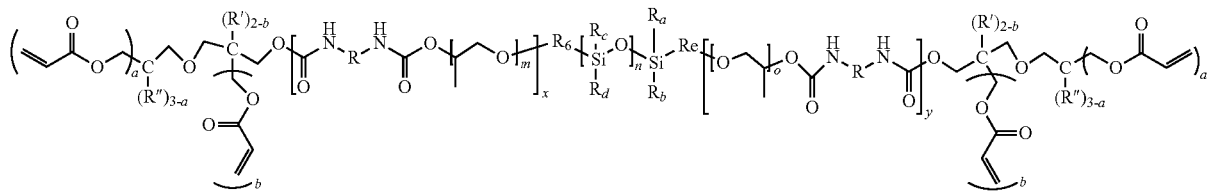

In Formula 1,

R is an aliphatic hydrocarbon group or an aromatic hydrocarbon group, $R_a$, $R_b$, $R_c$, and $R_d$ are each independently an unsubstituted or substituted alkyl group having 1 to 3 carbon atoms, $R_0$ is an unsubstituted or substituted alkylene group having 1 to 5 carbon atoms or

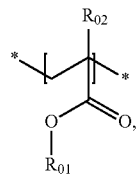

wherein $R_{01}$ is an unsubstituted or substituted alkyl group having 1 to 10 carbon atoms, an unsubstituted or substituted alkenyl group having 2 to 10 carbon atoms, a cycloalkyl group having 3 to 10 carbon atoms, a cycloalkyl group having 3 to 10 carbon atoms which has a heteroatom, an unsubstituted or substituted aryl kylene group having 2 to 20 carbon atoms, and wherein in the linear hydrocarbon group is selected from the group consisting of an unsubstituted or substituted alkylene group having 1 to 20 carbon atoms, an unsubstituted or substituted alkoxylene group having 1 to 20 carbon atoms, an unsubstituted or substituted alkenylene group having 2 to 20 carbon atoms, and an unsubstituted or substituted alkynylene group having 2 to 20 carbon atoms, and the aromatic hydrocarbon group of R may include at least one selected from the group consisting of an unsubstituted or substituted arylene group having 6 to 20 carbon atoms and an unsubstituted or substituted heteroarylene group having 2 to 20 carbon atoms.

For example, in Formula 1, R is an aliphatic hydrocarbon group, wherein the aliphatic hydrocarbon group may include (a) at least one alicyclic hydrocarbon group or (b) at least one linear hydrocarbon group, wherein the alicyclic hydrocarbon group selected is from the group consisting of an unsubstituted or substituted cycloalkylene group having 4 to 10 carbon atoms, an unsubstituted or substituted cycloalkenylene group having 4 to 10 carbon atoms, and an unsubstituted or substituted heterocycloalkylene group having 2 to 10 carbon atoms, and wherein the linear hydrocarbon group is selected from the group consisting of an unsubstituted or substituted alkylene group having 1 to 10 carbon atoms, an unsubstituted or substituted alkoxylene group having 1 to 10 carbon atoms, an unsubstituted or substituted alkenylene group having 2 to 10 carbon atoms, and an unsubstituted or substituted alkynylene group having 2 to 10 carbon atoms.

Specifically, in Formula 1, R is an aliphatic hydrocarbon group, wherein the aliphatic hydrocarbon group may include at least one selected from the group consisting of an unsubstituted or substituted cycloalkylene group having to 10 carbon atoms, an unsubstituted or substituted cycloalkenylene group having 4 to 10 carbon atoms, and an unsubstituted or substituted heterocycloalkylene group having 2 to 10 carbon atoms.

Specifically, the oligomer represented by Formula 1 may be an oligomer represented by Formula 1a below.

[Formula 1a]

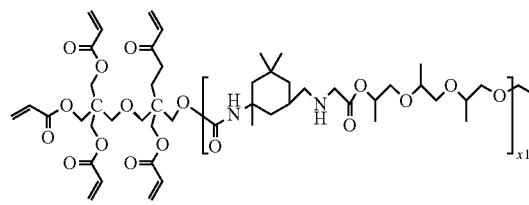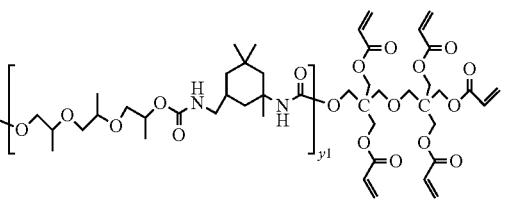

In Formula 1a,
n1, x1, and y1 are the numbers of repeating units,
n1 is an integer of 1 or 10,
x1 is an integer of 1 to 15, and
y1 is an integer of 1 to 15.

Since the oligomer represented by Formula 1 possesses the ability to dissociate the lithium salt, the oligomer may improve lithium ion mobility, and may suppress gas generation and ignition during overcharge by particularly controlling a side reaction of lithium ions ($Li^+$) and a decomposition reaction of the lithium salt.

The oligomer represented by Formula 1 may be included in an amount of 0.2 wt % to 30 wt %, particularly 0.5 wt % to 20 wt %, and more particularly 1 wt % to 10 wt % based on the total weight of the gel polymer electrolyte composition for a lithium secondary battery.

If the amount of the oligomer represented by Formula 1 is 0.2 wt % or more, for example, 0.5 wt % or more, a gel polymer electrolyte may be prepared in which mechanical strength may be ensured by forming a stable network structure. If the amount of the oligomer is 30 wt % or less, for example, 20 wt % or less, wettability may be secured by preventing an increase in resistance due to the addition of the excessive amount of the oligomer and, simultaneously, the decrease in ionic conductivity may be prevented by improving the mobility of lithium ions.

In a case in which the amount of the oligomer is less than 0.2 wt %, for example, 0.1 wt %, since the amount of the oligomer is excessively small, a gel may not be formed. Also, in a case in which the amount of the oligomer is greater than 30 wt %, the oligomer is not completely dissolved, but remains in the ionic liquid to cause the increase in resistance. Particularly, since the oligomer has a low dielectric constant, the lithium salt is difficult to be uniformly dissolved in the gel polymer electrolyte composition when the amount of the oligomer is increased, and the ionic conductivity may be reduced because the lithium ion mobility is reduced due to a dense polymer matrix structure formed after curing.

A weight-average molecular weight (Mw) of the oligomer represented by Formula 1 may be controlled by the number of repeating units, and may be in a range of about 1,000 g/mol to about 100,000 g/mol, particularly 1,000 g/mol to 50,000 g/mol, and more particularly 1,000 g/mol to 10,000 g/mol. In a case in which the weight-average molecular weight of the oligomer is within the above range, formation of a polymer matrix (network) may be facilitated to form a stable gel polymer electrolyte. Thus, high-temperature durability of the secondary battery may be effectively improved by suppressing ignition due to overcharge.

If the weight-average molecular weight of the oligomer is less than 1,000 g/mol, the formation of the polymer matrix may be difficult and mechanical strength of the gel polymer electrolyte may be reduced. If the weight-average molecular weight is greater than 100,000 g/mol, since physical properties of the oligomer itself become rigid and an affinity to an electrolyte solvent is reduced, dissolution is difficult, and thus, performance of the lithium secondary battery may be degraded.

The weight-average molecular weight may denote a standard polystyrene-equivalent value measured by gel permeation chromatography (GPC), and, unless otherwise specified, a molecular weight may denote the weight-average molecular weight. For example, in the present invention, the GPC conditions are as follows: the weight-average molecular weight is measured by using 1200 series by Agilent Technologies, a PL mixed B column by Agilent Technologies may be used in this case, and tetrahydrofuran (THF) may be used as a solvent.

Since the oligomer represented by Formula 1 is electrochemically stable by exhibiting a balanced affinity for a positive electrode or separator (SRS layer), as a hydrophilic part, and a negative electrode or separator fabric, as a hydrophobic part, in the secondary battery, the oligomer may be a great help in improving the performance of the lithium secondary battery. That is, since the oligomer represented by Formula 1 contains a siloxane group (—Si—O—) and a urethane group (—NH—C(O)O—), as a hydrophobic portion, as well as an acrylate-based functional group as a hydrophilic portion capable of forming a crosslink at both ends by itself, the oligomer represented by Formula 1 acts as a surfactant in the battery to be able to reduce surface resistance of an electrode interface. Therefore, the electrolyte for a lithium secondary battery including the oligomer represented by Formula 1 may secure a better wetting effect.

In addition, since the oligomer represented by Formula 1 possesses the ability to dissociate the lithium salt, the oligomer may improve lithium ion mobility. Particularly, since it contains a siloxane group (—Si—O—) having relatively high electrochemical stability and low reactivity with Li ions as a main chain repeating unit, it may control the side reaction of lithium ions (Li+) and the decomposition reaction of the lithium salt, and thus, the generation of gas, such as CO or $CO_2$, may be reduced during overcharge. Accordingly, stability of the secondary battery may be improved by suppressing ignition during the overcharge.

Therefore, with respect to a gel polymer electrolyte prepared by the gel polymer electrolyte composition of the present invention including the oligomer represented by Formula 1 instead of a polymer having a skeleton of alkylene oxide, such as ethylene oxide, propylene oxide, or butylene oxide, which has been commercialized during the preparation of a conventional gel polymer electrolyte, or dialkyl siloxane, fluorosiloxane, or a graft polymer and a block copolymer having units thereof, since a side reaction with the electrode is reduced, an effect of stabilizing an interface between the electrode and the electrolyte may be achieved, and thus, an effect of inhibiting corrosion of a current collector may be improved.

It is desirable that the oligomer represented by Formula 1 does not include a fluorine element. For example, in a case in which a main chain of the oligomer represented by Formula 1 is substituted with a fluorine element, since the oligomer is not easily dissolved in the ionic liquid, as the main solvent, due to the hydrophobic fluorine element, the preparation of a gel polymer electrolyte may not be possible during thermal polymerization.

(5) Additive for Forming SEI

The gel polymer electrolyte composition according to the embodiment of the present invention may further include an additional additive which may form a stable film on surfaces of the negative electrode and the positive electrode while not significantly increasing initial resistance in addition to the effect from the ionic liquid and oligomer, or which may act as a complementary agent for suppressing the decomposition of the solvent in the gel polymer electrolyte composition and improving the mobility of lithium ions.

The additional additive is not particularly limited as long as it is an additive for forming a solid electrolyte interface (SEI) which may form a stable film on the surfaces of the positive electrode and the negative electrode.

Specifically, as a representative example, the additive for forming an SEI may include at least one additive for forming an SEI which is selected from the group consisting of a halogen-substituted carbonate compound, a nitrile compound, a cyclic carbonate compound, a phosphate compound, a borate compound, a sultone compound, a cyclic sulfite compound, and a lithium salt compound.

Specifically, the halogen-substituted carbonate compound may include fluoroethylene carbonate (FEC) and may be included in an amount of 5 wt % or less based on the total weight of the gel polymer electrolyte composition. In a case in which the amount of the halogen-substituted carbonate compound is greater than 5 wt %, cell swelling performance may deteriorate.

Also, the nitrile compound may include at least one compound selected from the group consisting of succinonitrile, adiponitrile (Adn), acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

In a case in which the nitrile compound is used with the above-described mixed additive, an effect, such as an improvement of high-temperature characteristics, may be expected due to positive electrode/negative electrode film stabilization. That is, the nitrile compound may act as a complementary agent for forming the negative electrode SEI, may play a role in suppressing the decomposition of the solvent in the electrolyte, and may play a role in improving the mobility of the lithium ions. The nitrile compound may be included in an amount of 8 wt % or less based on the total weight of the gel polymer electrolyte composition. In a case in which the total amount of the nitrile compound in the non-aqueous electrolyte solution is greater than 8 wt %, since the resistance is increased due to an increase in the film formed on the surface of the electrode, battery performance may deteriorate.

The carbonate compound may improve durability of the battery by forming a stable SEI mainly on the surface of the negative electrode during battery activation. The cyclic carbonate compound may include vinylene carbonate (VC) or vinyl ethylene carbonate, and may be included in an amount of 3 wt % or less based on the total weight of the gel polymer electrolyte composition. In a case in which the amount of the cyclic carbonate compound in the gel polymer electrolyte composition is greater than 3 wt %, cell swelling inhibition performance and initial resistance may deteriorate.

Furthermore, since the phosphate compound stabilizes $PF_6$ anions in the gel polymer electrolyte composition and assists in the formation of the positive electrode and negative electrode films, the phosphate compound may improve the durability of the battery. The phosphate compound may include at least one compound selected from the group consisting of lithium difluoro bis(oxalato)phosphate (LiDFOP), lithium difluorophosphate (LiDFP, $LiPO_2F_2$), lithium tetrafluoro(oxalato)phosphate (LiDFOP), trimethylsilyl phosphite (TMSPi), tris(2,2,2-trifluoroethyl)phosphate (TFEPa), and tris(trifluoroethyl)phosphite (TFEPi), and the phosphate compound may be included in an amount of 3 wt % or less based on the total weight of the gel polymer electrolyte composition.

Since the borate compound promotes ion-pair separation of the lithium salt, the borate compound may improve the mobility of lithium ions, may reduce the interfacial resistance of the SEI, and may dissociate a material, such as LiF, which may be formed during the battery reaction but is not well separated, and thus, a problem, such as generation of hydrofluoric acid gas, may be solved. The borate compound may include lithium bis(oxalato)borate (LiBOB, $LiB(C_2O_4)_2$), lithium oxalyldifluoroborate, or tris(trimethylsilyl)borate (TMSB), and the borate compound may be included in an amount of 3 wt % or less based on the total weight of the gel polymer electrolyte composition.

Typical examples of the sultone compound may be 1,3-propane sultone (PS) and 1,4-butane sultone, and unsaturated sultone may include ethene sultone, 1,3-propene sultone, 1,4-butene sultone, or 1-methyl-1,3-propene sultone.

Typical examples of the cyclic sulfite compound may be ethylene sulfite (Esa), methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, or 1,3-butylene glycol sulfite.

Also, the lithium salt compound is a compound different from the lithium salt included in the gel polymer electrolyte composition, wherein the lithium salt compound may include at least one compound selected from the group consisting of LiODFB and $LiBF_4$ and may be included in an amount of 3 wt % or less based on the total weight of the gel polymer electrolyte composition.

Two or more additives for forming an SEI may be mixed and used, and the additive for forming an SEI may be included in an amount of 20 wt % or less, and particularly 0.01 wt % to 10 wt %, for example, 0.1 wt % to 5.0 wt % based on a total amount of the gel polymer electrolyte composition.

In a case in which the amount of the additive for forming an SEI is less than 0.01 wt %, high-temperature storage characteristics and gas generation reducing effect to be achieved from the additive may be insignificant, and, in a case in which the amount of the additive for forming an SEI is greater than 20 wt %, the side reaction in the gel polymer electrolyte composition during charge and discharge of the battery may excessively occur. Particularly, if the excessive amount of the additive for forming an SEI is added, the additive for forming an SEI may not be sufficiently decomposed so that it may be present in the form of an unreacted material or precipitates in the gel polymer electrolyte composition at room temperature. Accordingly, resistance may be increased to degrade life characteristics of the secondary battery.

The additives are compounds capable of suppressing the occurrence of the side reaction in the positive electrode and negative electrode films, wherein, in a case in which at least one of the additives is included in an amount of 10 wt % or less, the additive does not affect oxidation stability of the electrolyte and a calorific value due to an electrolyte decomposition reaction, and, since the additive is mostly consumed and decomposed to protect the surface of the negative electrode during initial activation, the additive does not remain.

It is desirable that the gel polymer electrolyte composition of the present invention does not include a non-aqueous organic solvent used in a non-aqueous electrolyte solution.

The non-aqueous organic solvent, for example, may include a carbonate-based organic solvent, an ether-based organic solvent, or an ester-based organic solvent.

The carbonate-based organic solvent among the organic solvents may include at least one selected from a cyclic carbonate-based organic solvent and a linear carbonate-based organic solvent. Specifically, the cyclic carbonate-based organic solvent may include ethylene carbonate (EC), propylene carbonate (PC), 1,2-butylene carbonate, 2,3-butylene carbonate, 1,2-pentylene carbonate, 2,3-pentylene carbonate, vinylene carbonate, or fluoroethylene carbonate (FEC).

The linear carbonate-based organic solvent, as a solvent with low viscosity and low permittivity, may include dimethyl carbonate (DMC), diethyl carbonate (DEC), dipropyl carbonate, ethylmethyl carbonate (EMC), methylpropyl carbonate, or ethylpropyl carbonate.

The ether-based organic solvent may include dimethyl ether, diethyl ether, dipropyl ether, methylethyl ether, methylpropyl ether, or ethylpropyl ether.

The ester-based organic solvent may include at least one selected from the group consisting of a linear ester-based organic solvent and a cyclic ester-based organic solvent.

Specific examples of the linear ester-based organic solvent may be methyl acetate, ethyl acetate, propyl acetate, methyl propionate, ethyl propionate, propyl propionate, or butyl propionate.

The cyclic ester-based organic solvent may include butyrolactone, valerolactone, or caprolactone.

Since the non-aqueous organic solvent as described above is oxidatively decomposed at high temperature and high voltage to cause irreversible capacity, there is a concern that the non-aqueous organic solvent may reduce stability at high temperature and high voltage. Thus, it is desirable that the non-aqueous organic solvent is not included in the gel polymer electrolyte composition of the present invention in terms of ensuring the stability of the secondary battery.

[Gel Polymer Electrolyte]

Also, in an embodiment of the present invention, a gel polymer electrolyte, which is prepared by polymerizing the gel polymer electrolyte composition for a lithium secondary battery of the present invention in an inert atmosphere, may be provided.

The gel polymer electrolyte of the present invention should have an elastic modulus of at least 1,000 Pa or more to be able to maintain in the form of a gel, and, specifically, it is desirable to have an elastic modulus of 5,000 Pa or more, for example, 6,000 Pa to 60,000 Pa in order to exhibit excellent performance in the lithium secondary battery.

The elastic modulus was measured in a frequency range of 0.1 Hz to 10 Hz using a rotational rheometer (DHR2).

After injecting the gel polymer electrolyte composition into the secondary battery, the gel polymer electrolyte may be prepared by curing the gel polymer electrolyte composition by thermal polymerization.

For example, the gel polymer electrolyte may be formed by in-situ polymerization of the gel polymer electrolyte composition in the secondary battery.

Specifically, the gel polymer electrolyte may be prepared by the steps of:
(a) inserting an electrode assembly composed of a positive electrode, a negative electrode, and a separator disposed between the positive electrode and the negative electrode into a battery case;
(b) injecting the gel polymer electrolyte composition of the present invention into the battery case;
(c) wetting and aging the electrode assembly; and
(d) polymerizing the gel polymer electrolyte composition to form a gel polymer electrolyte.

In this case, an in-situ polymerization reaction in the lithium secondary battery may be performed by using electron beam (E-beam), γ-ray, and room temperature or high temperature aging processes, and, according to an embodiment of the present invention, the in-situ polymerization reaction may be performed by thermal polymerization. In this case, polymerization time required may be in a range of about 2 minutes to about 48 hours, and thermal polymerization temperature may be in a range of 60° C. to 100° C., for example, 60° C. to 80° C.

Specifically, in the in-situ polymerization reaction in the lithium secondary battery, the polymerization initiator as well as the oligomer and ionic liquid is added to the non-aqueous organic solvent, in which the lithium salt is dissolved, and mixed, and the mixture is then injected into a battery cell. After an electrolyte injection hole of the battery cell is sealed, the gel polymer electrolyte of the present invention may be prepared by performing thermal polymerization in which the battery cell is heated to about 60° C. to about 80° C. for 1 hour to 20 hours.

[Lithium Secondary Battery]

Furthermore, in an embodiment of the present invention, provided is a lithium secondary battery including the gel polymer electrolyte of the present invention.

The lithium secondary battery according to the embodiment of the present invention has a charge voltage ranging from 3.0 V to 5.0 V, and thus, capacity characteristics of the lithium secondary battery may be excellent in both normal and high voltage ranges. Also, the stability at high temperature and high voltage may be further improved.

The lithium secondary battery of the present invention may include an electrode assembly in which a positive electrode, a separator, and a negative electrode are sequentially stacked, and, in this case, those prepared by typical methods may be used as the positive electrode, the negative electrode, and the separator which constitute the electrode assembly.

(1) Positive Electrode

The positive electrode may be prepared by forming a positive electrode material mixture layer on a positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

Also, the positive electrode material mixture layer may be prepared by coating the positive electrode collector with a positive electrode slurry including a positive electrode active material, a binder, a conductive agent, and a solvent, and then drying and rolling the coated positive electrode collector.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}O_2$ (where $0<Y2<1$), $LiMn_{2-Z1}Co_{z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{1/3}Mn_{1/3}CO_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.2}Mn_{0.15}Co_{0.15})O_2$, and $Li(Ni_{0.8}Mn_{0.1}Co_{0.1})O_2)$, or lithium nickel cobalt aluminum oxide (e.g., $LiNi_{0.8}Co_{0.15}Al_{0.05}O_2$, etc.).

The positive electrode active material may be included in an amount of 80 wt % to 99 wt %, for example, 85 wt % to 95 wt % based on a total weight of solid content in the positive electrode slurry. In a case in which the amount of the positive electrode active material is 80 wt % or less, since energy density is decreased, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer, a sulfonated-ethylene-propylene-diene terpolymer, a styrene-butadiene rubber, a fluoro rubber, various copolymers, and the like.

Any conductive agent may be used as the conductive agent without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The conductive agent is commonly added in an amount of 1 wt % to 30 wt % based on the total weight of the solid content in the positive electrode slurry.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the slurry including the positive electrode active material as well as selectively the binder and the conductive agent is in a range of 10 wt % to 60 wt %, for example, 20 wt % to 55 wt %.

(2) Negative Electrode

The negative electrode may be prepared by forming a negative electrode material mixture layer on a negative electrode collector. The negative electrode material mixture layer may be formed by coating the negative electrode collector with a slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_{x5}Fe_2O_3$ ($0 \leq x5 \leq 1$), $Li_{x6}WO_2$ ($0 \leq x6 \leq 1$), and $Sn_xMe_{1-x7}Me'_{y5}O_{z5}$ (Me: manganese (Mn), Fe, Pb, or Ge; Me': Al, boron (B), phosphorus (P), Si, Groups I, II and III elements of the periodic table, or halogen; $0 < x7 \leq 1$; $1 \leq y5 \leq 3$; $1 \leq z5 \leq 8$) may be used as the metal composite oxide.

The material, which may be doped and undoped with lithium, may include Si, $SiO_{x8}$ ($0 < x82$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubidium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer, a sulfonated-ethylene-propylene-diene terpolymer, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as selectively the binder and the conductive agent are included. For example, the solvent may be included in an amount such that a concentration of the solid content including the negative electrode active material as well as selectively the binder and the conductive agent is in a range of 50 wt % to 75 wt %, for example, 50 wt % to 70 wt %.

(3) Separator

Also, the separator plays a role in blocking an internal short circuit between both electrodes and impregnating the electrolyte, wherein, after mixing a polymer resin, a filler, and a solvent to prepare a separator composition, the separator composition is directly coated on the electrode and dried to form a separator film, or, after the separator composition is cast on a support and dried, the separator may be prepared by laminating a separator film peeled from the support on the electrode.

A typically used porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

In this case, the porous separator may generally have a pore diameter of 0.01 μm to 50 μm and a porosity of 5% to 95%. Also, the porous separator may generally have a thickness of 5 μm to 300 μm.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Preparation of Gel Polymer Electrolyte Composition for Lithium Secondary Battery)

A gel polymer electrolyte composition was prepared by adding 5 g of the oligomer represented by Formula 1a (weight-average molecular weight (Mw): 3,000, n1=9, x1 and y1=10) and 0.01 g of dimethyl 2,2'-azobis(2-methylpropionate) (CAS No. 2589-57-3), as a polymerization initiator, to 94.99 g of ethylmethylimidazolium-bis(fluorosulfonyl)imide (EMI-FIS) in which 1.0 M LiFSI was dissolved (see Table 1 below).

(Electrode Assembly Preparation)

$LiNi_{1/3}Co_{1/3}Mn_{1/3}O_2$ (NCM) as a positive electrode active material, carbon black as a conductive agent, and polyvinylidene fluoride (PVDF), as a binder, were added in a weight ratio of 94:3:3 to N-methyl-2-pyrrolidone (NMP), as a solvent, to prepare a positive electrode mixture slurry. An about 20 μm thick aluminum (Al) thin film, as a positive electrode collector, was coated with the positive electrode mixture slurry and dried, and the coated Al thin film was then roll-pressed to prepare a positive electrode.

A negative electrode active material (graphite), PVDF as a binder, and carbon black, as a conductive agent, were added in a weight ratio of 96:3:1 to NMP, as a solvent, to prepare a negative electrode mixture slurry. A 10 μm thick copper (Cu) thin film, as a negative electrode collector, was coated with the negative electrode mixture slurry and dried, and the coated Cu thin film was then roll-pressed to prepare a negative electrode.

An electrode assembly was prepared by sequentially stacking the positive electrode, a separator formed of three layers of polypropylene/polyethylene/polypropylene (PP/PE/PP), and the negative electrode.

(Secondary Battery Preparation)

After the assembled electrode assembly was put in a battery case and the gel polymer electrolyte composition for a lithium secondary battery was injected thereinto, and the battery case was left standing in a chamber at 65° C. for 5 hours to prepare a lithium secondary battery including a gel polymer electrolyte.

Example 2

A gel polymer electrolyte composition for a lithium secondary battery and a lithium secondary battery including a gel polymer electrolyte prepared therefrom were prepared in the same manner as in Example 1 except that methylpropylpyrrolidinium-bis(fluorosulfonyl)imide (Pyr13-FSI) was used as a solvent during the preparation of the gel polymer electrolyte composition for a lithium secondary battery (see Table 1 below).

Example 3

A lithium secondary battery including a gel polymer electrolyte was prepared in the same manner as in Example 1 except that a gel polymer electrolyte composition was prepared by adding 30 g of the oligomer represented by Formula 1a (weight-average molecular weight (Mw): 3,000, n1=9, x1 and y1=10) and 0.1 g of dimethyl 2,2'-azobis(2-methylpropionate) (CAS No. 2589-57-3), as a polymerization initiator, to 69.9 g of methylpropylpyrrolidinium-bis(fluorosulfonyl)imide (Pyr13-FSI) in which 1.0 M LiFSI was dissolved (see Table 1 below).

Example 4

A lithium secondary battery including a gel polymer electrolyte was prepared in the same manner as in Example 1 except that a gel polymer electrolyte composition was prepared by adding 1 g of the oligomer represented by Formula 1a (weight-average molecular weight (Mw): 3,000, n1=9, x1 and y1=10) and 0.01 g of dimethyl 2,2'-azobis(2-methylpropionate) (CAS No. 2589-57-3), as a polymerization initiator, to 98.99 g of methylpropylpyrrolidinium-bis(fluorosulfonyl)imide (Pyr13-FSI) in which 1.0 M LiFSI was dissolved (see Table 1 below).

Example 5

A lithium secondary battery including a gel polymer electrolyte was prepared in the same manner as in Example 1 except that a gel polymer electrolyte composition was prepared by adding 10 g of the oligomer represented by Formula 1a (weight-average molecular weight (Mw): 3,000, n1=9, x1 and y1=10) and 0.1 g of dimethyl 2,2'-azobis(2-methylpropionate) (CAS No. 2589-57-3), as a polymerization initiator, to 90 g of ethylmethylimidazolium-bis(fluorosulfonyl)imide (EMI-FIS) in which 1.0 M LiFSI was dissolved (see Table 1 below).

Example 6

A lithium secondary battery including a gel polymer electrolyte was prepared in the same manner as in Example 1 except that a gel polymer electrolyte composition was prepared by adding 40 g of the oligomer represented by Formula 1a (weight-average molecular weight (Mw): 3,000, n1=9, x1 and y1=10) and 0.1 g of dimethyl 2,2'-azobis(2-methylpropionate) (CAS No. 2589-57-3), as a polymerization initiator, to 59 g of ethylmethylimidazolium-bis(fluorosulfonyl)imide (EMI-FIS) in which 1.0 M LiFSI was dissolved (see Table 1 below).

Comparative Example 1

A gel polymer electrolyte composition for a lithium secondary battery and a lithium secondary battery including a gel polymer electrolyte prepared therefrom were prepared in the same manner as in Example 1 except that a non-aqueous organic solvent (ethylene carbonate (EC):ethyl methyl carbonate (EMC)=volume ratio of 3:7), instead of the ionic liquid, was used as a main solvent during the preparation of the gel polymer electrolyte composition for a lithium secondary battery (see Table 1 below).

Comparative Example 2

A gel polymer electrolyte composition for a lithium secondary battery and a lithium secondary battery including a gel polymer electrolyte prepared therefrom were prepared in the same manner as in Example 1 except that an oligomer represented by the following Formula 7 was used as the oligomer during the preparation of the gel polymer electrolyte composition for a lithium secondary battery (see Table 1 below).

[Formula 7]

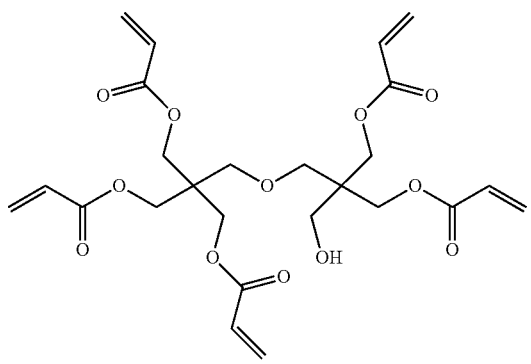

Comparative Example 3

(Preparation of Gel Polymer Electrolyte Composition for Lithium Secondary Battery)

5 g of an oligomer represented by the following Formula 8 (weight-average molecular weight: 3,500, p1=3, p2=5) and 0.01 g of dimethyl 2,2'-azobis(2-methylpropionate) (CAS No. 2589-57-3), as a polymerization initiator, were added to 94.99 g of ethylmethylimidazolium-bis(fluorosulfonyl)imide (EMI-FIS) in which 1.0 M LiFSI was dissolved. In this case, since the oligomer represented by Formula 8 was not dissolved in the ionic liquid, a composition for a gel polymer electrolyte may not be prepared.

EXPERIMENTAL EXAMPLES

Experimental Example 1: Self-Extinguish Test

Self-extinguish time experiments, in which 1 g of each of the gel polymer electrolyte compositions for a lithium secondary battery prepared in Examples 1 to 6 and 1 g of the gel polymer electrolyte composition for a lithium secondary battery prepared in Comparative Example 1 were respectively ignited to measure time until each sample caught fire, were performed to evaluate flame retardancy. The results thereof are presented in Table 2 below.

TABLE 2

|  | SET (seconds) |
|---|---|
| Example 1 | 0 |
| Example 2 | 0 |
| Example 3 | 0 |
| Example 4 | 0 |
| Example 5 | 0 |
| Example 6 | 0 |
| Comparative Example 1 | 10 |

Referring to Table 2, it may be understood that the gel polymer electrolyte compositions for a lithium secondary battery prepared in Examples 1 to 6 of the present invention were not fired, but the gel polymer electrolyte composition of Comparative Example 1, which included the non-aqueous organic solvent as a main solvent, not only caught fire, but also time to catch fire (SET value) was short at 10 seconds.

[Formula 8]

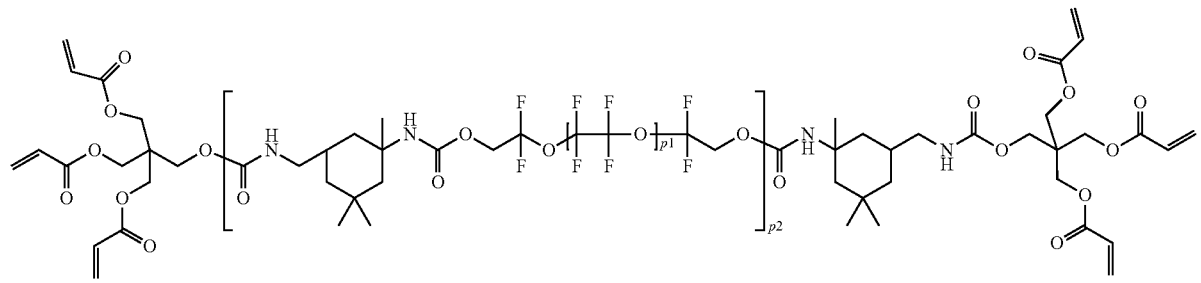

TABLE 1

|  |  | Ionic Liquid |  | Non-aqueous organic solvent |  | Oligomer |  | Polymerization Initiator |
|---|---|---|---|---|---|---|---|---|
|  | Lithium salt | Type | Amount added (g) | Type | Amount added (g) | Formula | Amount added (g) | Amount added (g) |
| Example 1 | 1.0M LiFSI | EMI-FIS | 94.99 | — | — | 1a | 5 | 0.01 |
| Example 2 | 1.0M LiFSI | Pyr13-FSI | 94.99 | — | — | 1a | 5 | 0.01 |
| Example 3 | 1.0M LiFSI | Pyr13-FSI | 69.9 | — | — | 1a | 30 | 0.1 |
| Example 4 | 1.0M LiFSI | Pyr13-FSI | 98.99 | — | — | 1a | 1 | 0.01 |
| Example 5 | 1.0M LiFSI | EMI-FIS | 90 | — | — | 1a | 10 | 0.1 |
| Example 6 | 1.0M LiFSI | EMI-FIS | 59 | — | — | 1a | 40 | 0.1 |
| Comparative Example 1 | 1.0M LiFSI | — | — | EC:EMC = 3:7 | 94.99 | 1a | 5 | 0.01 |
| Comparative Example 2 | 1.0M LiFSI | EMI-FIS | 94.99 | — | — | 7 | 5 | 0.01 |
| Comparative Example 3 | 1.0M LiFSI | EMI-FIS | 94.99 | — | — | 8 | 5 | 0.01 |

From these results, it may be understood that flame retardancies of the gel polymer electrolyte compositions for a lithium secondary battery of Examples 1 to 6 were improved in comparison to that of the gel polymer electrolyte composition of Comparative Example 1.

Experimental Example 2: Gel Strength Measurement Test of Gel Polymer Electrolyte Each of the gel polymer electrolyte compositions prepared in Examples 1 to 4 and 6 and each of the gel polymer electrolyte compositions for a lithium secondary battery prepared in Comparative Examples 1 and 2 were respectively put in a holder with a diameter of 25 mm and a width of 5 mm and sealed, and thermal polymerization was then performed at 65° C. for 5 hours to prepare samples for measuring physical properties. Gel strength (modulus) was measured by measuring viscoelastic behavior of each of the prepared samples in a frequency range of 0.1 Hz to 10 Hz using a rotational rheometer (DHR2 by TA Instruments). In this case, strengths at 1 Hz are presented in Table 3 below.

TABLE 3

|  | Gel strength (Pa) |
| --- | --- |
| Example 1 | 9,800 |
| Example 2 | 12,000 |
| Example 3 | 50,000 |
| Example 4 | 7,000 |
| Example 6 | 100,000 |
| Comparative Example 1 | 3,500 |
| Comparative Example 2 | 2,900 |

Referring to Table 3, it may be confirmed that the gel polymer electrolytes prepared by using the gel polymer electrolyte compositions of Examples 1 to 4 had a gel strength of about 7,000 Pa or more.

In contrast, the gel polymer electrolyte prepared by using the gel polymer electrolyte composition of Comparative Example 1 including the non-aqueous organic solvent as a main solvent had a gel strength of 3,500 Pa, wherein it may be understood that its gel strength was degraded in comparison to those of the gel polymer electrolytes prepared by using the gel polymer electrolyte compositions of Examples 1 to 4.

Also, the gel polymer electrolyte prepared by using the gel polymer electrolyte composition of Comparative Example 2 including the oligomer of Formula 7 had a gel strength of 2,900 Pa, wherein it may be understood that its gel strength was degraded in comparison to those of the gel polymer electrolytes prepared by using the gel polymer electrolyte compositions of Examples 1 to 4.

That is, with respect to the oligomer represented by Formula 7, since its affinity with the ionic liquid was lower than that of the oligomer represented by Formula 1, solubility was low, and thus, it was not mixed well with the ionic liquid. Since the insolubility of the oligomer is very unfavorable to the distribution of the polymer matrix even after the formation of the gel polymer electrolyte, it is difficult to expect an improvement in the mechanical strength of the gel polymer electrolyte. Thus, with respect to the gel polymer electrolyte of Comparative Example 2 including the oligomer of Formula 7, it may be understood that its gel strength was the lowest in comparison to those of the gel polymer electrolytes prepared in Examples 1 to 6 of the present invention.

The gel polymer electrolyte prepared by using the gel polymer electrolyte composition of Example 6, in which the excessive amount of the oligomer of Formula 1 was added, had a gel strength of 100,000 Pa, which was excessively high gel strength. Since the gel polymer electrolyte of Example 6 having the above gel strength value exhibited almost no elasticity as a gel polymer and was rigid to exhibit brittle characteristics, the gel polymer electrolyte of Example 6 may not be suitable for a gel polymer electrolyte.

Experimental Example 3: Calorific Value Test

The lithium secondary batteries prepared in Examples and 2 and the lithium secondary batteries prepared in Comparative Examples 1 and 2 were respectively fully charged to 4.2 V, and then disassembled to separate a positive electrode. After a positive electrode active material layer was scraped off from the positive electrode obtained from each lithium secondary battery to obtain powder, the powder was loaded into a differential scanning calorimeter (DSC, DSC-01, METTLER TOLEDO) and exothermic onset points were measured while heating from 25° C. to 400° C. at a heating rate of 10° C./min, and the results thereof are presented in FIG. 1. In FIG. 1, the axis of abscissas represents exothermic temperature, and the axis of ordinates represents a point at a heat flow of 20 W/g. Also, a calorific value according to the temperature was measured, and the results thereof are presented in Table 4 below. In this case, the calorific value may be obtained from an area corresponding to a peak of each graph which appeared at a heat flow of 20 W/g.

TABLE 4

|  | Average calorific value (J/g) |
| --- | --- |
| Example 1 | 26.5 |
| Example 2 | 76.1 |
| Comparative Example 1 | 97.5 |
| Comparative Example 2 | 234.2 |

In general, a structure of the positive electrode in a fully charged state is in a state in which lithium is deintercalated, wherein, since the positive electrode is structurally unstable, an oxygen radical is generated while the structure is collapsed when the positive electrode is left standing at a high temperature. Since the oxygen radical generated in this case has very high reactivity, the oxygen radical causes an exothermic reaction while reacting with the electrolyte.

Referring to FIG. 1 and Table 4, with respect to the lithium secondary battery of Comparative Example 1, it may be understood that an exothermic reaction was started from about 240° C. to about 250° C. due to structural collapse of the positive electrode and a reaction of an oxygen radical generated in this case with the electrolyte, and a calorific value was also high at 97.5 J/g.

In contrast, with respect to the lithium secondary batteries of Examples 1 and 2, it may be understood that exothermic reactions were started from about 260° C. to about 270° C., higher temperatures than that of the secondary battery of Comparative Example 1 while the exothermic reactions were delayed because the ionic liquid suppressed the structural collapse of the positive electrode and the reactivity with the oxygen radicals was relatively low. In this case, a calorific value of the secondary battery of Example 1 was 26.5 J/g, and a calorific value of the secondary battery of Example 2 was 76.1 J/g, wherein it may be understood that these values were lower than the calorific value of the secondary battery of Comparative Example 1.

With respect to the secondary battery of Comparative Example 2, heat generation started from about 270° C. due to the influence of the ionic liquid included in the gel polymer electrolyte, but it may be understood a calorific value was very high at 234.2 J/g due to an additional exothermic reaction caused by the oligomer of Formula 7 different from the oligomer of Formula 1.

From these results, it may be confirmed that high-temperature stabilities of the lithium secondary batteries of Examples 1 and 2 of the present invention were improved in comparison to those of the secondary batteries of Comparative Examples 1 and 2.

Experimental Example 4: Oxidation Stability Test of Electrolyte (LSV Test)

After a platinum (Pt) disc electrode as a working electrode, a lithium metal as a reference electrode, and a platinum (Pt) wire electrode, as an auxiliary electrode, were used and respectively immersed in the gel polymer electrolyte prepared in Example 1 and the gel polymer electrolyte prepared in Comparative Example 1, stabilities of the aluminum current collectors were evaluated using linear sweep voltammetry at a scanning rate of 20 mV/s in a glove box in an argon (Ar) atmosphere in which a concentration of moisture and oxygen was 10 ppm or less. The results thereof are presented in FIG. 2.

Figure 2:
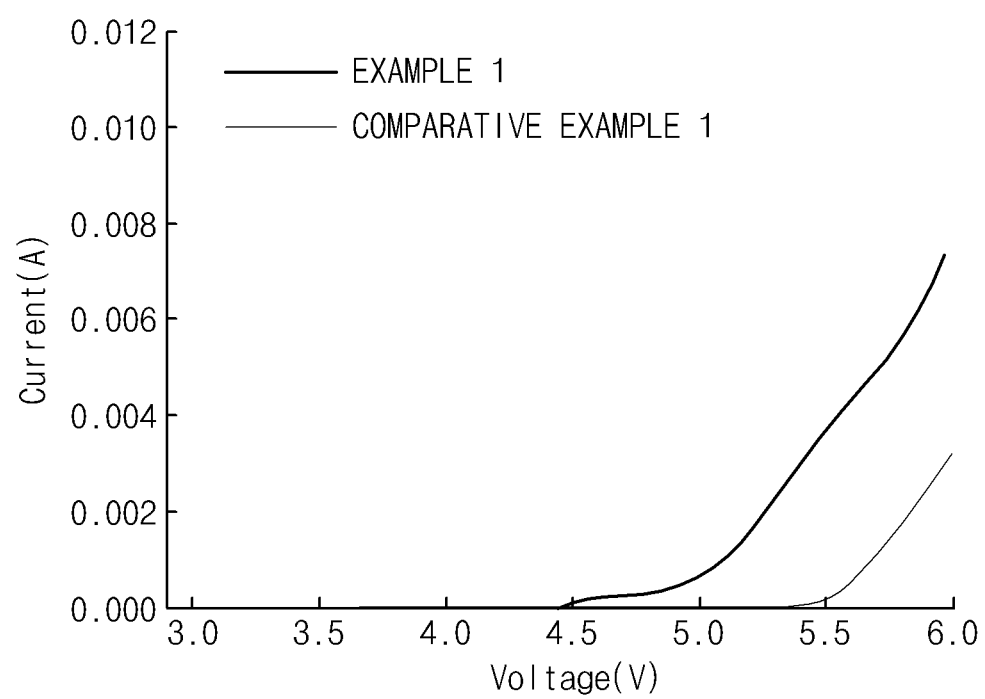
FIG. 2 is a graph showing results of evaluating oxidation stabilities of electrolytes in Experimental Example 4 of the present invention.

Referring to FIG. 2, it may be understood that, with respect to the gel polymer electrolyte of Example 1 which contained the ionic liquid having excellent oxidation resistance, an oxidative decomposition potential (1 mA current generation potential) was 5.6 V or more, but an oxidative decomposition potential of the gel polymer electrolyte of Comparative Example 1 containing the carbonate-based solvent was 5.0 V.

From these results, oxidation resistance of the gel polymer electrolyte of the example of the present invention was better than that of the gel polymer electrolyte of Comparative Example 1, and it is expected that an effect of preventing corrosion of the current collector may also be improved by such physical properties.

Experimental Example 5: Ionic Conductivity Evaluation

Each of the gel polymer electrolyte compositions prepared in Examples 1, 2, 4, and 6 and each of the gel polymer electrolyte compositions for a lithium secondary battery prepared in Comparative Examples 1 and 2 were coated on a first steel use stainless (SUS) layer and cured to prepare gel polymer electrolytes.

Each of the prepared gel polymer electrolytes was covered with a second SUS layer to prepare a multilayer structure composed of first SUS layer/gel polymer electrolyte/second SUS layer, resistance was then measured in a frequency range of 0.1 Hz to 100 MHz using a VMP3 measurement instrument and a precision impedance analyzer (4294A) at 25° C., an ionic conductivity value was calculated by dividing the resistance by an area of the stainless steel electrode and a thickness of the gel polymer electrolyte (see Equation 1 below). The results thereof are presented in Table 5 below.

$$\text{Ionic conductivity } \delta = R/(A \times I) \quad \text{[Equation 1]}$$

In Equation 1, R represents resistance, A represents an area of the stainless steel electrode, and I represents a thickness of the gel polymer electrolyte.

TABLE 5

| | Ionic conductivity (S/cm, 25° C.) |
|---|---|
| Example 1 | $9.5 \times 10^{-3}$ |
| Example 2 | $6.5 \times 10^{-3}$ |
| Example 4 | $10.5 \times 10^{-3}$ |
| Example 6 | $0.2 \times 10^{-3}$ |
| Comparative Example 1 | $5.3 \times 10^{-3}$ |
| Comparative Example 2 | $4.8 \times 10^{-3}$ |

Referring to Table 5, it may be understood that ionic conductivities of the gel polymer electrolytes prepared by using the gel polymer electrolyte compositions of Examples 1, 2, and 4 were mostly high at $6.5 \times 10^{-3}$ S/cm or more. Particularly, it may be understood that the ionic conductivity of the gel polymer electrolyte composition of Example 1, which included the ionic liquid having viscosity lower than that of the gel polymer electrolyte composition of Example 2, was higher.

In contrast, ionic conductivity of the gel polymer electrolyte of Comparative Example 1, which included the non-aqueous organic solvent as a main solvent, was $5.3 \times 10^{-3}$ S/cm, wherein it may be understood that the ionic conductivity was lower than those of the gel polymer electrolytes of Examples 1, 2, and 4. That is, since the gel polymer electrolyte of Comparative Example 1 without the ionic liquid had no advantage by an effect of ion hopping, one of lithium ion transfer phenomena by the ionic liquid, and the ion conductivity was expressed only by the simple movement of lithium ions, it may be understood that the ionic conductivity was lower than those of the gel polymer electrolytes of Examples 1, 2, and 4.

Also, with respect to the gel polymer electrolyte of Comparative Example 2, since transfer characteristics of lithium were not uniform due to the non-uniform distribution of the oligomer, it may be understood that ionic conductivity was lower than those of the gel polymer electrolytes of Examples 1, 2, and 4.

With respect to the gel polymer electrolyte prepared by using the gel polymer electrolyte composition of Example 6, since the dissolution of the lithium salt became difficult due to the excessive amount of the oligomer included and the mobility of lithium ions was reduced while the viscosity of the composition was increased, it may be understood that ionic conductivity was degraded in comparison to those of the gel polymer electrolytes of Examples 1, 2, and 4.

Experimental Example 6: Initial Discharge Capacity Test

The lithium secondary batteries prepared in Examples 1, 2, 4, and 6 and the lithium secondary batteries prepared in Comparative Examples 1 and 2 were respectively charged at 0.33 C/4.25 V under a constant current/constant voltage (CC/CV) condition at 25° C. and discharged at a constant current of 0.33 C/3.0 V. In this case, discharge capacity measured using PNE-0506 charge/discharge equipment (manufacturer: PNE SOLUTION Co., Ltd., 5 V, 6 A) after cell assembly/before high-temperature storage was defined as initial discharge capacity. The measured initial discharge capacities are presented in Table 6 below.

TABLE 6

| | Initial discharge capacity (Ah) |
|---|---|
| Example 1 | 1.15 |
| Example 2 | 1.1 |

TABLE 6-continued

| | Initial discharge capacity (Ah) |
|---|---|
| Example 4 | 1.1 |
| Example 6 | 0.75 |
| Comparative Example 1 | 1.05 |
| Comparative Example 2 | 0.8 |

Referring to Table 6, it may be understood that initial discharge capacity of the lithium secondary battery of Comparative Example 1, which included the gel polymer electrolyte containing the non-aqueous organic solvent as a main solvent, was 1.05 Ah, but initial discharge capacities of the lithium secondary batteries of Examples 1, 2, and 4, which included the gel polymer electrolytes including the ionic liquid as a main solvent, were improved to 1.1 Ah.

That is, since the gel polymer electrolyte of the present invention including the ionic liquid exhibited excellent ion transfer characteristics, it may be understood that the initial discharge capacity of the lithium secondary battery including the same is higher.

Also, with respect to the lithium secondary battery of Comparative Example 2 which included the gel polymer electrolyte containing a polymer matrix derived from the oligomer of Formula 7, it may be understood that initial discharge capacity was lower than those of the lithium secondary batteries of Examples 1, 2, and 4 while the mobility of lithium ions in the battery was interfered with the non-uniformly distributed polymer matrix.

With respect to lithium secondary battery of Example 6 which included the gel polymer electrolyte in which the amount of the oligomer was excessively large, since ion transfer characteristics were very poor, it may be understood that initial discharge capacity was lower than those of the lithium secondary batteries of Examples 1, 2, and 4.

Experimental Example 7: Hot Box Test

Hot box tests were performed in which the lithium secondary battery prepared in Example 1 and the lithium secondary battery prepared in Comparative Example 1 were heated to 150° C. at a heating rate of 5° C./min in a fully charged state, i.e., a state of charge (SOC) of 100%, and were then respectively left standing for 30 minutes to confirm the presence of ignition. The results thereof are presented in FIGS. 3 and 4 below.

Figure 3:
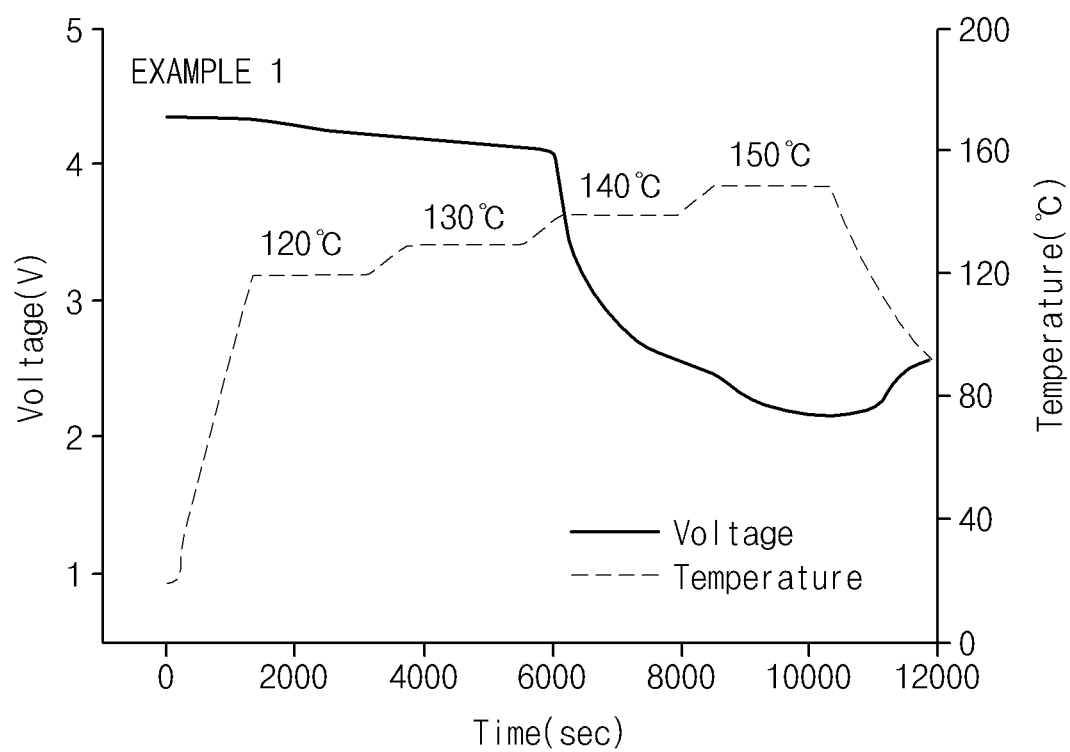
FIGS. 3 and 4 are graphs showing results of hot box tests of lithium secondary batteries according to Experimental Example 7 of the present invention.
Figure 4:
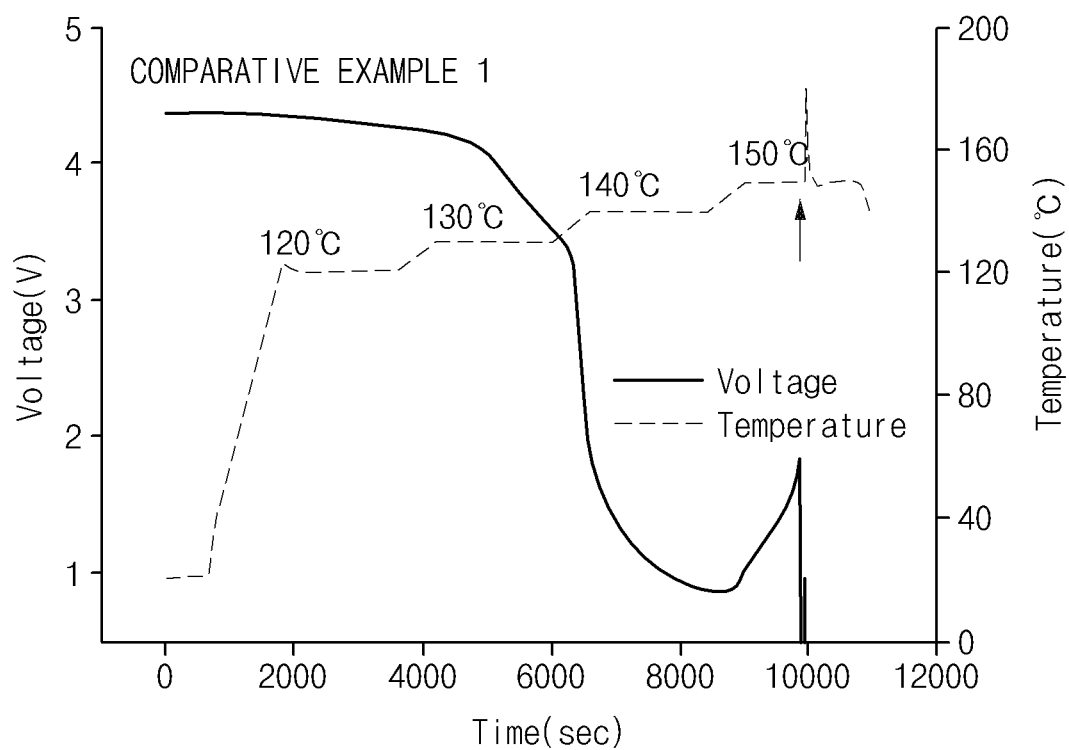

In this case, FIG. 3 illustrates the results of the hot box test of the lithium secondary battery of Example 1, and FIG. 4 illustrates the results of the hot box test of the lithium secondary battery of Comparative Example 1.

That is, referring to FIG. 3, since the lithium secondary battery of Example 1 may suppress the generation of oxygen radicals by preventing the collapse of the positive structure even during high-temperature storage in a fully charged state, an exothermic reaction was reduced, and thus, it may be understood that ignition did not occur even during high-temperature storage at 150° C.

In contrast, referring to FIG. 4, with respect to the lithium secondary battery of Comparative Example 1, since a thermal runaway phenomenon occurred during high-temperature storage at 150° C., it may be understood that an abrupt voltage drop and ignition occurred.

The invention claimed is:

1. A gel polymer electrolyte composition for a lithium secondary battery, the gel polymer electrolyte composition comprising:
   a lithium salt, an ionic liquid, a polymerization initiator, and
   an oligomer, represented by Formula 1:

[Formula 1]

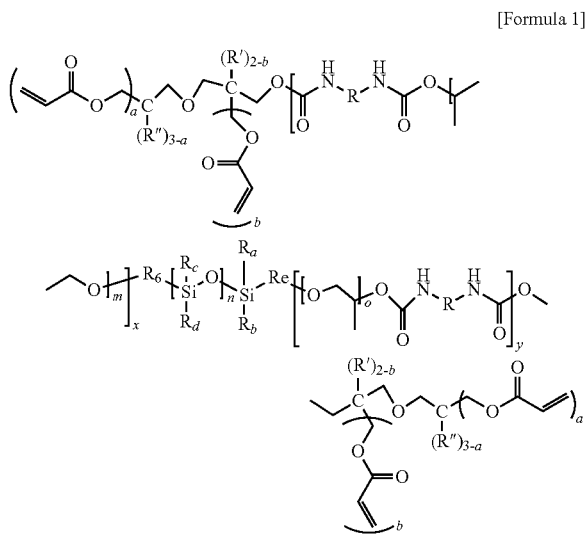

wherein, in Formula 1,

R is an aliphatic hydrocarbon group or an aromatic hydrocarbon group, $R_a$, $R_b$, $R_c$, and $R_d$ are each independently an unsubstituted or substituted alkyl group having 1 to 3 carbon atoms, $R_0$ is an unsubstituted or substituted alkylene group having 1 to 5 carbon atoms or

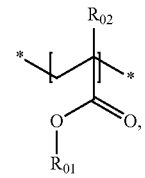

wherein $R_{01}$ is an unsubstituted or substituted alkyl group having 1 to 10 carbon atoms, an unsubstituted or substituted alkenyl group having 2 to 10 carbon atoms, a cycloalkyl group having 3 to 10 carbon atoms, a cycloalkyl group having 3 to 10 carbon atoms which has a heteroatom, an unsubstituted or substituted aryl group, or an unsubstituted or substituted heteroaryl group, $R_{02}$ is hydrogen or an unsubstituted or substituted alkyl group having 1 to 3 carbon atoms, R' and R" are each independently hydrogen or an alkyl group having 1 to 3 carbon atoms, $R_e$ is an unsubstituted or substituted alkylene group having 1 to 5 carbon atoms, a is an integer of 1 to 3, b is an integer of 0 to 2, n, m, o, x, and y are numbers of repeating units, n is an integer of 1 to 10, m and o are each independently an integer of 1 to 5, and x and y are each independently an integer of 1 to 15, wherein the ionic liquid includes an anion component selected from the group consisting of $ClO_4^-$, bis(fluorosulfonyl)imide ($N(SO_2F)_2^-$; FSI), bisperfluoroethanesulfonimide ($N(SO_2C_2F_5)_2^-$), and oxalyldifluoroborate ($BF_2(C_2O_4)^-$; ODFB).

2. The gel polymer electrolyte composition for a lithium secondary battery of claim 1, wherein the lithium salt comprises $Li^+$ as a cation, and at least one anion selected from the group consisting of $BF_4^-$, $PF_6^-$, $ClO_4^-$, bis(fluorosulfonyl)imide ($N(SO_2F)_2^-$; FSI), (bis)trifluoromethanesulfonimide ($N(SO_2CF_3)_2^-$, TFSI), bisperfluoroethanesulfonimide ($N(SO_2C_2F_5)_2^-$), and oxalyldifluoroborate ($BF_2(C_2O_4)^-$, ODFB).

3. The gel polymer electrolyte composition for a lithium secondary battery of claim 1, wherein the ionic liquid comprises an anion component which is the same as an anion of the lithium salt, and a cation component comprising comprises at least one selected from the group consisting of compounds represented by Formulae 2 to 6:

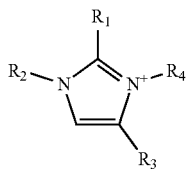

[Formula 2]

wherein, in Formula 2, $R_1$, $R_2$, $R_3$, and $R_4$ are each independently hydrogen or an alkyl group having 1 to 5 carbon atoms,

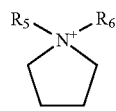

[Formula 3]

wherein, in Formula 3, $R_5$ and $R_6$ are each independently an alkyl group having 1 to 5 carbon atoms,

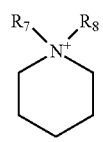

[Formula 4]

wherein, in Formula 4, $R_7$ and $R_8$ are each independently an alkyl group having 1 to 5 carbon atoms,

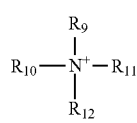

[Formula 5]

wherein, in Formula 5, $R_9$, $R_{10}$, $R_{11}$, and $R_{12}$ are each independently an alkyl group having 1 to 5 carbon atoms,

[Formula 6]

wherein, in Formula 6, $R_{13}$, $R_{14}$, $R_{15}$, and $R_{16}$ are each independently an alkyl group having 1 to 5 carbon atoms.

4. The gel polymer electrolyte composition for a lithium secondary battery according to claim 3, wherein the cation represented by Formula 2 is at least one selected from the group consisting of cations represented by Formulae 2a and 2b:

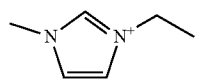

[Formula 2a]

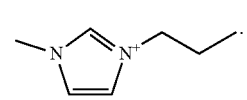

[Formula 2b]

5. The gel polymer electrolyte composition for a lithium secondary battery of claim 3, wherein the cation component represented by Formula 3 comprises at least one selected from the group consisting of compounds represented by Formulae 3a and 3b:

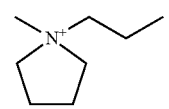

[Formula 3a]

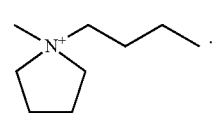

[Formula 3b]

6. The gel polymer electrolyte composition for a lithium secondary battery of claim 3, wherein the cation component represented by Formula 4 comprises at least one selected from the group consisting of compounds represented by Formulae 4a and 4b:

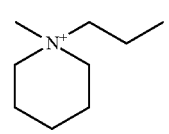

[Formula 4a]

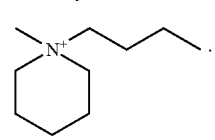

[Formula 4b]

7. The gel polymer electrolyte composition for a lithium secondary battery according to claim 3, wherein, in Formula 5, $R_9$, $R_{10}$, $R_{11}$, and $R_{12}$ are each independently an alkyl group having 1 to 3 carbon atoms.

8. The gel polymer electrolyte composition for a lithium secondary battery according to claim 3, wherein the cation component represented by Formula 6 comprises a cation represented by Formula 6a:

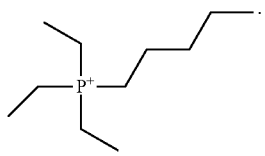

[Formula 6a]

9. The gel polymer electrolyte composition for a lithium secondary battery according to claim 1, wherein, in Formula 1, $R_a$, $R_b$, $R_c$, and $R_d$ are each independently an unsubstituted or substituted alkyl group having 1 to 2 carbon atoms,
$R_0$ is an unsubstituted or substituted alkylene group having 1 to 5 carbon atoms,
R' and R" are each independently hydrogen or an alkyl group having 1 to 2 carbon atoms,
$R_e$ is an unsubstituted or substituted alkylene group having 1 to 3 carbon atoms, and
m and o are each independently an integer of 2 to 4.

10. The gel polymer electrolyte composition for a lithium secondary battery according to claim 1, wherein, in Formula 1, the aliphatic hydrocarbon group of R comprises (a) at least one alicyclic hydrocarbon group or (b) at least one linear hydrocarbon group,
wherein the alicyclic hydrocarbon group is selected from the group consisting of an unsubstituted or substituted cycloalkylene group having 4 to 20 carbon atoms, an unsubstituted or substituted cycloalkenylene group having 4 to 20 carbon atoms, and an unsubstituted or substituted heterocycloalkylene group having 2 to 20 carbon atoms, and
wherein the linear hydrocarbon group is selected from the group consisting of an unsubstituted or substituted alkylene group having 1 to 20 carbon atoms, an unsubstituted or substituted alkoxylene group having 1 to 20 carbon atoms, an unsubstituted or substituted alkenylene group having 2 to 20 carbon atoms, and an unsubstituted or substituted alkynylene group having 2 to 20 carbon atoms, and
the aromatic hydrocarbon group of R comprises at least one selected from the group consisting of an unsubstituted or substituted arylene group having 6 to 20 carbon atoms and an unsubstituted or substituted heteroarylene group having 2 to 20 carbon atoms.

11. The gel polymer electrolyte composition for a lithium secondary battery according to claim 1, wherein, in Formula 1, R is an aliphatic hydrocarbon group,
wherein the aliphatic hydrocarbon group comprises (a) at least one alicyclic hydrocarbon group or (b) at least one linear hydrocarbon group,
wherein the alicyclic hydrocarbon group is selected from the group consisting of an unsubstituted or substituted cycloalkylene group having 4 to 10 carbon atoms, an unsubstituted or substituted cycloalkenylene group having 4 to 10 carbon atoms, and an unsubstituted or substituted heterocycloalkylene group having 2 to 10 carbon atoms, and
wherein the linear hydrocarbon group is selected from the group consisting of an unsubstituted or substituted alkylene group having 1 to 10 carbon atoms, an unsubstituted or substituted alkoxylene group having 1 to 10 carbon atoms, an unsubstituted or substituted alkenylene group having 2 to 10 carbon atoms, and an unsubstituted or substituted alkynylene group having 2 to 10 carbon atoms.

12. The gel polymer electrolyte composition for a lithium secondary battery according to claim 1, wherein the oligomer represented by Formula 1 is an oligomer represented by Formula 1a:

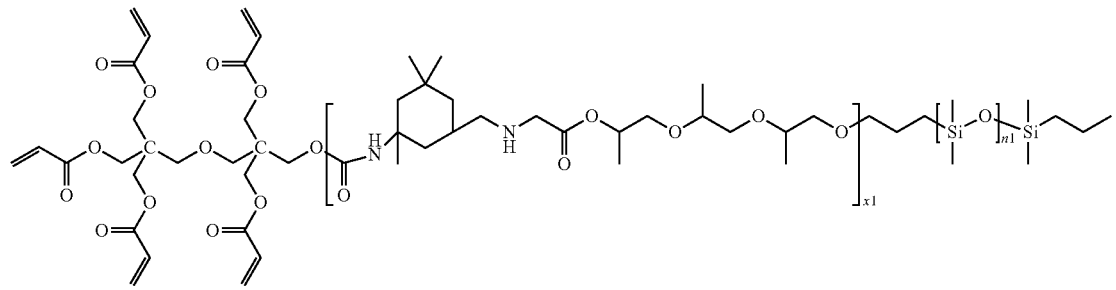

[Formula 1a]

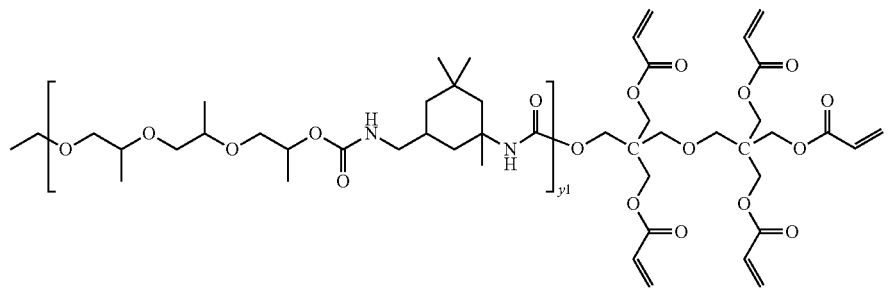

wherein, in Formula 1a,
n1, x1, and y1 are numbers of repeating units,
n1 is an integer of 1 or 10,
x1 is an integer of 1 to 15, and
y1 is an integer of 1 to 15.

13. The gel polymer electrolyte composition for a lithium secondary battery according to claim 1, wherein the oligomer represented by Formula 1 is included in an amount of 0.2 wt % to 30 wt % based on a total weight of the gel polymer electrolyte composition for a lithium secondary battery.

14. A gel polymer electrolyte prepared by polymerizing the gel polymer electrolyte composition for a lithium secondary battery of claim 1.

15. A lithium secondary battery comprising the gel polymer electrolyte of claim 14.

16. A lithium secondary battery comprising the gel polymer electrolyte composition of claim 1.

17. The gel polymer electrolyte composition for a lithium secondary battery of claim 1, wherein a weight-average molecular weight (Mw) of the oligomer represented by Formula 1 is present in a range of about 1,000 g/mol to about 100,000 g/mol.

18. The gel polymer electrolyte composition for a lithium secondary battery of claim 1, wherein the gel polymer electrolyte composition does not include a non-aqueous organic solvent.

19. The gel polymer electrolyte composition for a lithium secondary battery of claim 1, wherein the ionic liquid is included in an amount of 50 wt % or more based on a total weight of the gel polymer electrolyte composition.

* * * * *